US006834845B2

(12) United States Patent
Finke et al.

(10) Patent No.: US 6,834,845 B2
(45) Date of Patent: Dec. 28, 2004

(54) SOLENOID VALVE FOR CONTROLLING A FUEL INJECTOR

(75) Inventors: Uwe Finke, Weil der Stadt (DE); Tibor Bauer, Kornwestheim (DE)

(73) Assignee: Robert Bosch GmbH, Stuttgart (DE)

(*) Notice: Subject to any disclaimer, the term of this patent is extended or adjusted under 35 U.S.C. 154(b) by 92 days.

(21) Appl. No.: 10/278,596

(22) Filed: Oct. 22, 2002

(65) Prior Publication Data

US 2003/0087487 A1 May 8, 2003

(30) Foreign Application Priority Data

Oct. 23, 2001 (DE) ........................................ 101 52 173

(51) Int. Cl.[7] ................................................ F16K 31/02
(52) U.S. Cl. .............................. 251/129.14; 251/129.15
(58) Field of Search ........................ 251/129.01–129.22

(56) References Cited

U.S. PATENT DOCUMENTS 3,804,557 A * 4/1974 Bentley ...................... 417/402
4,640,304 A * 2/1987 Looney ...................... 137/202
4,946,107 A * 8/1990 Hunt ....................... 239/585.4
6,084,493 A * 7/2000 Siegel ........................ 335/278
6,161,813 A * 12/2000 Baumgartner et al. ........ 251/50
6,305,355 B1 * 10/2001 Hoffmann et al. .......... 123/467

FOREIGN PATENT DOCUMENTS

DE 196 50 865 6/1998

* cited by examiner

*Primary Examiner*—Paul J. Hirsch
(74) *Attorney, Agent, or Firm*—Kenyon & Kenyon

(57) ABSTRACT

A solenoid valve valve part for controlling a fuel injector in a fuel injection system has a valve needle, the open and closed positions of which may be controlled by the solenoid valve valve part. The solenoid valve valve part has a valve ball which rests on a valve seat and which lifts up from the valve seat when current flows through the solenoid valve valve part. The valve seat is in hydraulic connection with the fuel injector via a borehole. When the valve ball lifts up from the valve seat, a pressure medium such as high-pressure fuel flows through the borehole into a pressure relief chamber in the solenoid valve valve part. In the further progression this causes the fuel injector to open. To prevent the formation of cavitation bubbles and the damage thus caused, the borehole includes, at least in part, one or more sections having a cross section which continuously expands in the direction of the valve seat. A separation in flow brought about by sharp transition edges, which may cause cavitation bubbles, is thus counteracted.

7 Claims, 2 Drawing Sheets

SOLENOID VALVE FOR CONTROLLING A FUEL INJECTOR

FIELD OF THE INVENTION

The present invention relates to a solenoid valve for controlling a fuel injector.

BACKGROUND INFORMATION

Solenoid valves are used to control fuel injectors in a fuel injection system having a valve needle, the open and closed positions of which may be controlled by the solenoid valve.

The solenoid valve has a valve ball, which lifts up and opens a valve seat when current flows through the magnet assembly of the solenoid valve. This valve seat is in hydraulic connection with the control pressure chamber of the fuel injector via a borehole. When the valve seat opens, the pressure in the pressure chamber of the fuel injector drops, and the fluid (pressure medium) flows through the borehole in the direction of the valve seat and further into a pressure relief chamber. This causes the valve needle or the fuel injector to open.

It is believed that the common rail injector (CRI) operates according to this conventional operating principle, which permits a main injection and a pilot injection having very brief injection times. Such a solenoid valve is referred to, for example, in German Published Patent Application No. 196 50 865.

Cavitation may cause severe damage to the valve seat of the valve part. The borehole extending through the valve part includes a cylindrical A-throttle adjoining a pilot borehole in the control pressure chamber of the fuel injector, and a subsequent cylindrical diffuser bore leading to the valve seat. The cavitation damage may, for example, occur in the region of an abrupt transition from the diffuser bore to the valve seat. This damage may cause "washout" of the seat edge. As the damage increases, this edge may break off, resulting in total failure of the injector and operational failure of the vehicle. To solve this problem, the formation of cavitation bubbles should be reduced, and the site of implosion of any remaining bubbles should be shifted to a location, such that this effect no longer influences the correct functioning of the injector.

SUMMARY

An exemplary solenoid valve according to the present invention includes a borehole which has, at least in part, one or more sections having a cross section that continuously expands in the direction of the valve seat. Sharp-edged transitions within the borehole, for example, in the transition region from the A-throttle to the diffuser bore, may thus be avoided. It is believed that a conical geometry of the expanding section is advantageous.

A severe separation in flow may occur when the fluid (pressure medium) flows through the A-throttle to the outlet edge downstream, which is sharp-edged due to the manufacturing process, toward the diffuser bore. Dead water and recirculation areas may form at those locations. These effects may result in fluctuations in the reproducibility of the amount of fluid flowing through, as well as in the formation of zones at partial vacuum and cavitation bubbles.

Further within the borehole, the flow again contacts the bore walls. Shortly before reaching the throttle point at the valve seat situated further downstream, the pressure in the medium rises again and the cavitation bubbles floating in the liquid stream implode, thereby causing the described cavitation damage at the wall of the flow channel.

As a result of the borehole of an exemplary solenoid valve according to the present invention, the flow geometry in the valve part is altered, so that a generally turbulence-free transition of the medium from the A-throttle to the valve seat may be achieved without the described negative effects.

The transition from the A-throttle to the diffuser bore may, for example, be formed with a continuously expanding cross section, so that the borehole includes three sections that merge into one another. In this manner, separation of the flow at the sharp-edged outlet edge may be prevented.

Furthermore, the borehole, for example, may be divided into three sections: the A-throttle, the diffuser bore adjoining the section expanding in cross section, and the diffuser bore, the A-throttle and the diffuser bore having substantially the same length. It is believed that, in conventional designs, the A-throttle directly adjoins the diffuser bore, the latter having a greater length than the former. In an exemplary embodiment according to the present invention, both the A-throttle and the diffuser bore may be considerably shortened, thereby lowering the pressure, for example, in the diffuser bore. In conjunction with the continuously expanding (e.g., conical) transition region between the A-throttle and the diffuser bore, an optimum shape of the flow channel may be obtained, in which no cavitation bubbles are formed, and no implosions of these bubbles are observed.

In another exemplary embodiment according to the present invention, the borehole upstream from the valve seat has multiple, for example, conical, sections expanding in the direction of the valve seat. A good flow pattern may be obtained when each of the two cylindrical boreholes, e.g., the A-throttle and the diffuser bore, has a conically shaped section. For example, the length of the (cylindrical) diffuser bore may be reduced, so that the pressure rise within the diffuser bore is no longer sufficient to allow the implosion of any cavitation bubbles that may form. As described above, the conical sections connecting the cylindrical boreholes prevent separation of flow and, thus, prevent the cause of cavitation bubble formation.

The aperture angles of the successive conical sections in the direction of the valve seat may, for example, increase, thus permitting a gradual transition to the aperture angle of the valve seat. This may create an favorable flow pattern.

The sections that continuously expand in cross section, for example, may be created in a simple mechanical fashion by rounding off the respective transitions between the boreholes, such as the A-throttle and the diffuser bore. In this manner, the sharp edge of a transition may be machined during manufacturing to provide an optimum flow channel.

DETAILED DESCRIPTION

Figure 1:
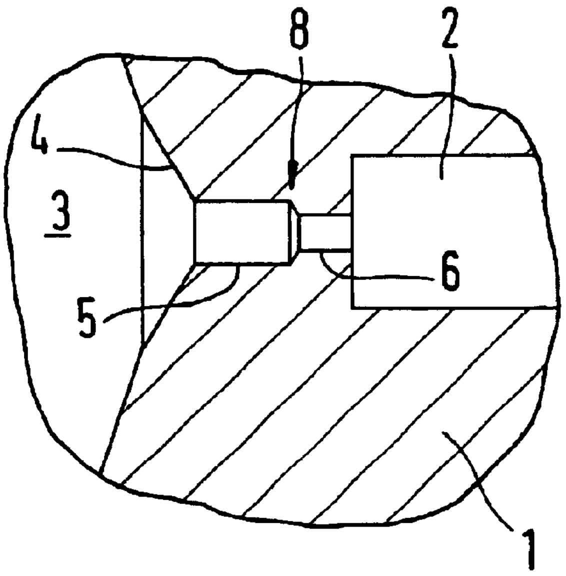
FIG. 1 is a sectional view through the valve part of a solenoid valve.

FIG. 1 illustrates the valve part 1 of a solenoid valve for controlling a conventional fuel injector. Borehole 2 leads to the control pressure chamber of a fuel injector, and is in hydraulic connection with valve seat 4 of pressure relief chamber 3 in the solenoid valve via an additional throttle bore. The throttle bore is formed from A-throttle 6 and subsequent diffuser bore 5, an abrupt change in cross section occurring between the cylindrical boreholes at the transition point.

When current flows through the solenoid valve, a valve ball (not shown) in pressure relief chamber 3 lifts up from valve seat 4, thereby allowing the pressure in the valve chamber to decrease in the direction of the valve ball due to the fact that a pressure medium, for example, high-pressure fuel, flows from borehole 2 via the throttle bore into pressure relief chamber 3. The pressure drop thus created in borehole 2 upstream from the adjoining control pressure chamber causes the valve needle of the fuel injector to open, and high-pressure fuel is injected.

As shown in FIG. 1, the structure formed by A-throttle 6 and diffuser bore 5 is referred to as the throttle bore. When fluid (e.g., pressure medium, for example, high-pressure fuel) flows through the throttle bore, a separation in the flow occurs at the sharp edge of the transition from A-throttle 6 to diffuser bore 5. This results in turbulence and the formation of dead water and recirculation areas. The shearing of flow causes cavitation bubbles to form, which are highly compressed in areas of high pressure, resulting in the risk of implosion. Imploding cavitation bubbles in the vicinity of the valve seat may cause damage, which, in the further progression, may result in “washout” of valve seat 4, so that proper opening and closing of the solenoid valve, and thus of the injector, may no longer guaranteed.

Figure 2:
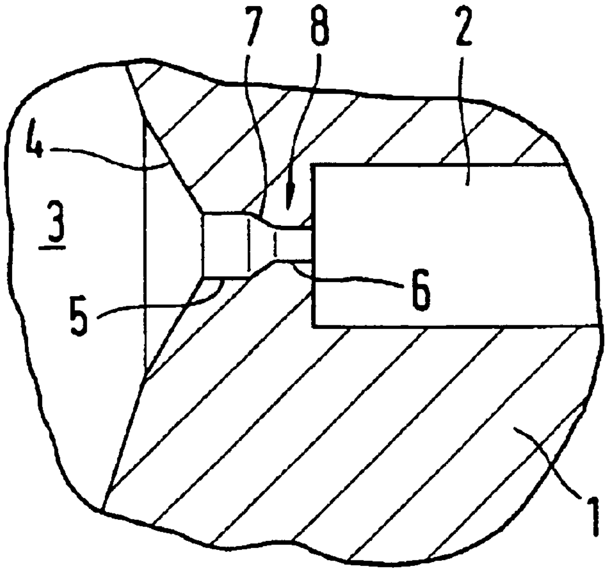
FIG. 2 is a sectional view through the valve part of an exemplary solenoid valve according to the present invention.

FIG. 2 shows an exemplary solenoid valve according to the present invention in the region of valve seat 4. Identical parts from FIG. 1 are provided with the same reference numbers in FIG. 2. A section 7 is provided, which has a continuously expanding cross section in the throttle bore between borehole 2 leading to the control pressure chamber and pressure relief chamber 3. In this exemplary embodiment, section 7 is produced by a method that rounds off the borehole transition between A-throttle 6 and diffuser bore 5. Simultaneously, both A-throttle 6 and diffuser bore 5 are considerably shortened in comparison to the conventional design shown in FIG. 1. In this manner, the flow geometry may be improved, so that cavitation damage may be avoided to the greatest extent possible. Thus, an exemplary solenoid valve according to the present invention may have fail-safe operability.

Figure 3:
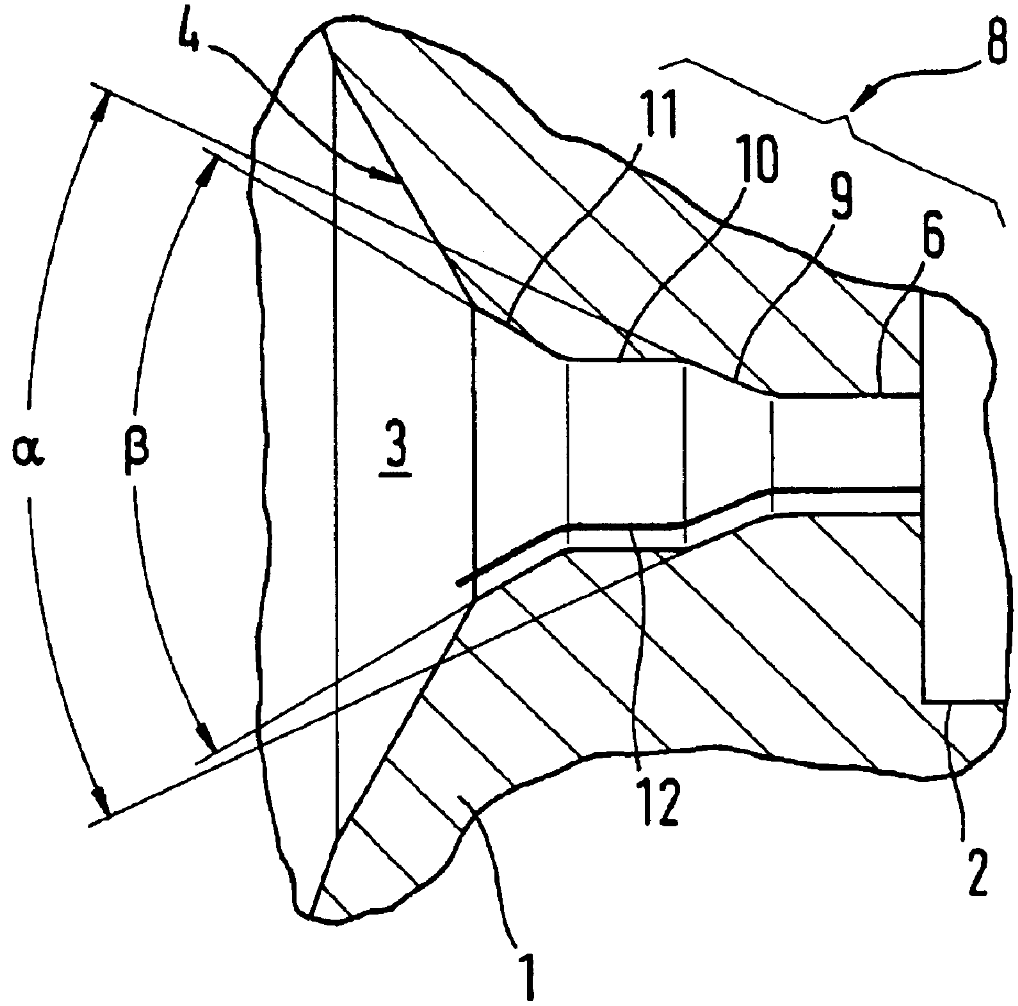
FIG. 3 is a sectional view through the valve part of another exemplary solenoid valve according to the present invention.

FIG. 3 shows another exemplary solenoid valve according to the present invention in the region of valve seat 4. In this design, A-throttle 6 again adjoins borehole 2, which leads to the control pressure chamber of the fuel injector, as a cylindrical borehole with a considerably reduced cross section. According to this exemplary embodiment, a first conical section 9 follows at an aperture angle α and is followed by a cylindrical diffuser bore 10, which is considerably shortened in comparison to earlier embodiments (see FIG. 1). Diffuser bore 16 is followed by a section 11 having a conically expanding cross section that opens into valve seat 4. Conical section 11 has an aperture angle β.

In this exemplary embodiment according to the present invention, aperture angle α is 50°, and angle β is 60°. Overall, the aperture angle of the flow channel is thus successively expanded to merge into the valve seat. The flow pattern may be very favorably influenced by this measure. The combination using the greatly shortened diffuser bore 10 prevents excessive pressure rises, which may allow any cavitation bubbles present to implode. The complete profile of the flow channel of borehole 8 is illustrated in FIG. 3, and is denoted by reference number 12.

The present invention may be used in any given cross section of a borehole, and the solenoid valve according to the present invention may include more than two sections having expanding cross sections within borehole 8. It is believed that the exemplary solenoid valve illustrated in FIG. 3 may sufficiently prevent cavitation damage, thus increasing the functional reliability of common rail injectors.

What is claimed is:

1. A solenoid valve for controlling a fuel injector in a fuel injector system, comprising:

a valve seat of a pressure relief chamber; and a valve ball arranged on the valve seat; wherein a borehole hydraulically connects the valve seat to a control pressure chamber of the fuel injector, the borehole including at least one section having a cross section that continuously expands in a direction of the valve seat.

2. The solenoid valve according to claim 1, wherein the borehole includes a first section, a second section, and a middle section merging into one another, a cross section of the middle section continuously expanding.

3. The solenoid valve according to claim 2, wherein the first and second sections adjoin the middle section and have lengths that are substantially the same.

4. The solenoid valve according to claim 1, wherein the borehole includes two sections having respective cross sections that continuously expand, and the two sections respectively adjoin another section having a constant diameter.

5. The solenoid valve according to claim 1, wherein the at least one section has a conical shape.

6. The solenoid valve according to claim 1, wherein the at least one section of the borehole are arranged as successive sections and wherein aperture angles of the successive sections of the borehole increase in the direction of the valve seat.

7. The solenoid valve according to claim 1, wherein the at least one section is manufactured by rounding off two borehole transitions.

* * * * *